No. 660,191. Patented Oct. 23, 1900.
J. W. HOLMES.
RAT TRAP.
(Application filed May 26, 1900.)
(No Model.)
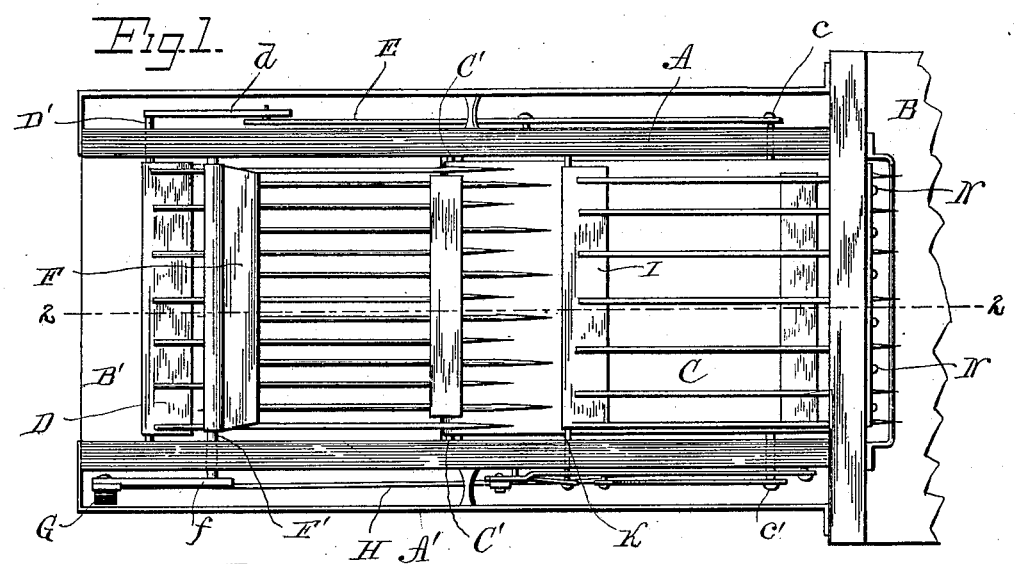
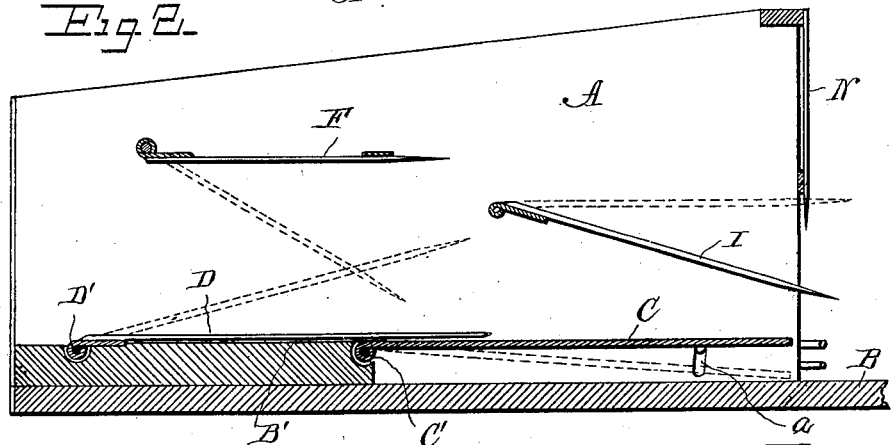
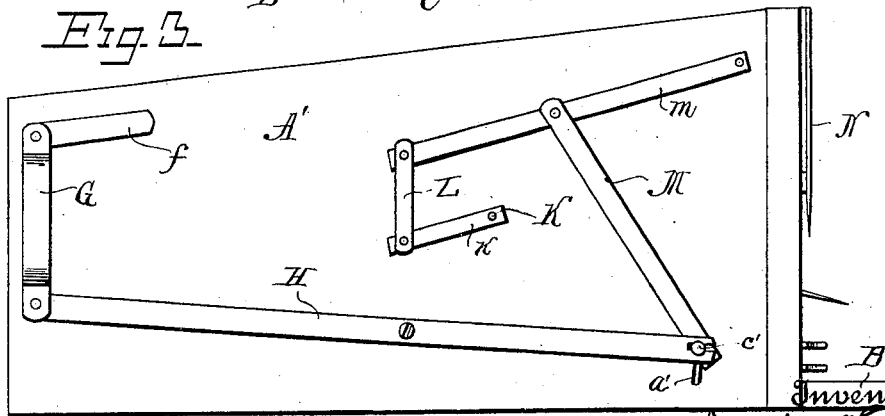
Witnesses
A. W. L. Ball
G. S. Elliott
Inventor
Joseph W. Holmes,
by John D. Thomas & Co.,
Attorneys.
THE NORRIS PETERS CO., PHOTO-LITHO., WASHINGTON, D. C.

UNITED STATES PATENT OFFICE.

JOSEPH W. HOLMES, OF JOPLIN, MISSOURI.

RAT-TRAP.

SPECIFICATION forming part of Letters Patent No. 660,191, dated October 23, 1900.

Application filed May 26, 1900. Serial No. 18,070. (No model.)

*To all whom it may concern:*

Be it known that I, JOSEPH W. HOLMES, a citizen of the United States, residing at Joplin, in the county of Jasper and State of Missouri, have invented new and useful Improvements in Rat-Traps, of which the following is a specification.

This invention is an improvement in animal-traps; and the object thereof is to provide a trap which is especially adapted for catching and imprisoning rats and other small animals.

The invention contemplates a construction of trap by which the animals are allured into a passage-way that is normally closed at its inner end and contains a tilting platform which is depressed by the weight of the animal and operates certain devices to open said inner end of the passage-way and close the outer end thereof in the rear of the animal, compelling said animal to continue on into the cage, the parts being reset automatically after the platform is relieved of the weight of the animal.

The following specification enters into a detailed description of the construction and operation of my invention, reference being had to the accompanying drawings, and to letters thereon which designate the different parts, and what I consider to be new in the construction and combination is more specifically set forth in the appended claims.

In the accompanying drawings, which form a part hereof, Figure 1 is a plan view illustrating my invention. Fig. 2 is a vertical sectional view on the line 2 2 of Fig. 1. Fig. 3 is a side elevation, a part of the outer wall being broken away.

Referring to said drawings, A and A' designate the side walls of the passage-way, and B designates the bottom board of the same. The front end of the bottom board B forms a raised platform B', while the rear end is cut away, as shown, to receive a pivoted platform C, the upper surface of which is normally on a plane with said raised platform. Said platform C is pivoted at its forward end upon a rod C', bearing at its ends in the side walls A and A', and this platform is adapted to operate the gates of the trap in the manner hereinafter set forth.

Normally resting upon the stationary platform B' is a pivoted wire gate D, said gate being pivoted at its forward end in the side walls of the passage-way by means of a transverse rod D', to which it is rigidly secured, and which rod lies in a depression in the platform, as shown. One end of the rod D' passes through the side wall A and has a rearwardly-projecting arm $d$ secured thereto, by which the gate is operated. The outer end of arm $d$ is engaged by the forward end of a lever E, and the rear end of said lever is engaged by a pin $c$, projecting from the free end of the pivoted platform C through a curved slot $a$ in the side wall A, so that said pivoted gate may be operated directly from the pivoted platform, it being noted that the free end of the pivoted gate D tilts upward upon the depression of the free end of said platform.

Located a suitable distance above the gate D is a gate F, the normal position of which is horizontal or parallel with the said gate D, the gate F being secured to a rod F', one end of which is extended through the side wall A' and has fixed thereon a forwardly-projecting arm $f$, said arm being connected by a weighted rod G to a lever H, which lever is also connected to the free end of the pivoted platform C by a pin $c'$, projecting from said platform through a curved slot $a'$ in the wall A'.

Located above the pivoted platform is a gate I, secured at its forward end to a rod K, bearing in the side walls of the passage-way, one end of said rod being extended through the wall A' and having fixed thereon a forwardly-projecting arm $k$, connected at its outer end to a rod L, carried by an arm $m$ of a rod M, extending from the free end of the pivoted platform C.

At the inner end of the passage-way are a series of depending bars N, the pointed lower ends of which terminate a suitable distance above the free end of the pivoted platform C to leave an opening through which the animal may pass, and it will be noted that the ends of the wires forming the gate I pass between these bars as said gate is raised and lowered and that the normal position of said gate closes the opening or space below the ends of the bars.

Each pivoted gate is made up of longitudinal wires connected by cross-pieces, as shown, the outer ends of said wires being pointed to prod the animal and prevent an attempt to force said gates.

In the normal position of the parts, with the platform C on a level with the platform B', the gates D and F at the forward end of the passage-way are disposed horizontally, leaving a space between them through which the animal may pass onto the platform C, the gate I being inclined downward, as shown. When the animal steps upon the platform C, said platform will be depressed, and, operating the levers E and H and rod M, will cause the free ends of the gates D and F to cross and raise the gate I. This will clear the opening leading into the cage and will present an obstruction at the forward end of the passage-way to prevent the animal from backing out. When the animal passes into the cage, the platform C, being relieved of its weight, will be returned to its normal position by means of the weighted rod G, and returning to its normal position will also return the gates to their normal position, the gate I being down to prevent the animal from escaping, while the gates D and F are horizontal to permit another animal to enter the passage-way. The device therefore provides a very effective trap, for an animal will have a clear passage-way onto the pivoted platform, and should he become frightened by the lowering of said platform he will be prevented from retreating backward by the gates D and F.

Having thus described my invention, I do not wish to be limited to the precise construction herein shown and described, for it is obvious that the position of the gates might be changed or that other changes might be resorted to without sacrificing any of the advantages of the invention. I therefore desire to reserve the right to make such modifications or changes that will come within the spirit and scope of my claims.

I claim—

1. In an animal-trap, the combination of a passage-way, gates pivoted to the forward end of said passage-way, one above the other, a gate pivoted in the rear of the aforesaid gates, and a pivoted platform connected to the gates for operating the same, substantially as shown and described.

2. In an animal-trap, the combination, of a passage-way, gates pivoted to the forward end of said passage-way, one above the other, a gate pivoted in the rear of the aforesaid gates and adapted to normally close the opening leading into the cage, and a pivoted platform connected to all the gates, substantially as shown and for the purpose set forth.

3. In an animal-trap, the combination, of a passage-way having a raised platform at its forward end, a pivoted platform in the rear of said raised platform, a gate resting normally upon the raised platform, a lever connecting said gate to the pivoted platform, a gate pivoted above the aforesaid gate, a weighted rod and lever connecting said second gate to the pivoted platform, the free ends of said gates being adapted to interlock, substantially as shown and for the purpose set forth.

4. In an animal-trap, the combination, of a passage-way, a pivoted gate resting normally upon the bottom of said passage-way, a pivoted platform, a lever connecting said gate to said platform, a gate pivoted in the passage-way above the other gate, a weighted rod and lever connecting said second gate to the pivoted platform, a gate pivoted above the platform and adapted to normally close the opening leading into the cage, and rods connected to the gate and platform for operating the former, substantially as shown and described.

In testimony whereof I affix my signature in presence of two witnesses.

JOSEPH W. HOLMES.

Witnesses:
J. M. GRAHAM,
W. F. CHAPMAN.